Patented Oct. 28, 1924.

UNITED STATES PATENT OFFICE.

RICHARD TOBLER, OF BASEL, SWITZERLAND, ASSIGNOR TO SOCIETY OF CHEMICAL INDUSTRY IN BASLE, OF BASEL, SWITZERLAND.

PROCESS FOR THE MANUFACTURE OF INTERMEDIATE PRODUCTS AND NEW INTERMEDIATE PRODUCTS.

No Drawing.    Application filed November 23, 1923.   Serial No. 676,614.

*To all whom it may concern:*

Be it known that I, RICHARD TOBLER, residing at Basel, Switzerland, a citizen of the Swiss Republic, have invented a new and useful Process for the Manufacture of Intermediate Products and New Intermediate Products, of which the following is a full, clear, and exact specification.

This invention relates to products which are of great value for the manufacture of indigoid dyestuffs. It comprises the process of manufacture, and new products, especially the new compounds which arise here as intermediate products.

It has been found that thionaphthisatins are obtained if naphththioindoxyl derivatives are produced by first substituting in naphththioindoxyls the hydrogen atoms of the methylene group by radicals, such as halogens or anils, and then treating the intermediate products thus obtained with saponifying agents, such as for instance, inorganic or organic acids or also alkalies, whereby thionaphthisatins are formed by splitting off of the added radical in form of its product of reduction.

The new naphththioindoxyl derivatives thus obtained as intermediate products form yellow to metallic green powders which dissolve in organic solvents, such as benzene, with yellow to red violet color, whilst the thionaphthisatins constitute red crystals which dissolve in organic solvents to a reddish yellow solution. Both the new naphththioindoxyl derivatives as also the thionaphthisatins are of considerable value for the manufacture of indigoid dyestuffs.

Example 1.

200 parts of 2:1 naphththioindoxyl are dissolved at 25 to 30° C. in 2400 parts of glacial acetic acid. To this solution there is added at the above temperature, while stirring, a solution of 320 parts of bromine in 500 parts of glacial acetic acid. A brown, crystalline precipitate separates out and, after a short stirring, the bromine has disappeared. After filtration and recrystallization of the precipitate from hot glacial acetic acid, the 2-dibromide of the 2:1-thionaphthisatin is obtained in a good yield in the form of yellow crystals melting at 150° C.

The similar dibromide of the 2:3-thionaphthisatin melts at 158° C.; and the dibromide of the 4-chloro-1:2-thionaphthisatin at 178° C.

358 parts of 2-dibromide of the 2:1-thionaphthisatin are now introduced, while stirring, into 9000 parts of acetic acid of 40 per cent strength and the mixture heated to boiling. Under elimination of hydrogen bromide a reddish yellow solution is obtained. After a short boiling the reaction is complete. The solution is filtered hot, and from the filtrate the 2:1-naphththioisatin separates in a very good yield in the form of orange red crystals.

Example 2.

200 parts of 2:3-naphththioindoxyl are dissolved hot in 850 parts of caustic soda lye of 30 per cent strength and 12000 parts of water. After cooling to 50° C. a solution of 185 parts of nitrosodimethylaniline in 850 parts of alcohol is added, while stirring, and the stirring is continued for some hours at 45–50° C. The mixture is then filtered and washed with hot water until the filtrate becomes colorless. The green precipitate obtained is then dried. The para-dimethylamino-2:3-thionaphthisatinanil, once crystallized from benzene, forms green crystals which melt at 190° C.

Other anils of the thionaphthisatins show quite similar properties. For instance, the para-dimethylamino-2:1-thionaphthisatinanil forms green crystals melting at 228° C.; the para-dimethylamino-1:2-thionaphthisatinanil of similar appearance melts at 205° C.; the para-dimethylamina-4-chloro-1:2-thionaphthisatinanil forms green crystals melting at 269° C.; and the para-dimethylamino-1-chloro-2:3-thionaphthisatinanil forms green crystals melting at 272° C.

332 parts of para-dimethylamino-2:3-thionaphthisatinanil are now introduced, while stirring, into 4000 parts of sulfuric acid of 60 per cent strength yielding a violet red solution. This solution becomes lighter after a short time, 2:3-thionaphthisatin separating out. To complete the saponification, the mass is warmed at 40° C. whereupon the reaction mass is introduced into water, filtered from the precipitate which has separated out, and washed. The 2:3-thionaphthisatin is purified by dissolution in sodium carbonate and precipitation by means of hydrochloric acid. When crystallized once from benzene it is obtained in the form of orange colored crystals melting at 168° C.

What I claim is:

1. Process for the manufacture of intermediate products which are of great value for the manufacture of indigoid dyestuffs, consisting in substituting in naphththioindoxyls the hydrogen atoms of the active methylene group by radicals.

2. Process for the manufacture of intermediate products which are of great value for the manufacture of indigoid dyestuffs, consisting in substituting in naphththioindoxyls the hydrogen atoms of the active methylene group by an anil radical by condensing the naphththioindoxyls with an aromatic nitroso compound.

3. Process for the manufacture of intermediate products which are of great value for the manufacture of indigoid dyestuffs, consisting in substituting in ε-naphththioindoxyls the hydrogen atoms of the active methylene group by an anil radical by condensing the ε-naphththioindoxyls with an aromatic nitroso compound.

4. Process for the manufacture of intermediate products which are of great value for the manufacture of indigoid dyestuffs, consisting in substituting in ε-ε-naphththioindoxyls the hydrogen atoms of the active methylene group by an anil radical by condensing the ε-ε-naphththioindoxyls with an aromatic nitroso compound.

5. Process for the manufacture of intermediate products which are of great value for the manufacture of indigoid dyestuffs, consisting in substituting in naphththioindoxyls the hydrogen atoms of the active methylene group by radicals, and then treating the products thus obtained with saponifying agents.

6. Process for the manufacture of intermediate products which are of great value for the manufacture of indigoid dyestuffs, consisting in substituting in naphththioindoxyls the hydrogen atoms of the active methylene group by an anil radical by condensing the naphththioindoxyls with an aromatic nitroso compound, and then treating the products thus obtained with saponifying agents.

7. Process for the manufacture of intermediate products which are of great value for the manufacture of indigoid dyestuffs, consisting in substituting in ε-naphththioindoxyls the hydrogen atoms of the active methylene group by an anil radical by condensing the ε-naphththioindoxyls with an aromatic nitroso compound, and then treating the products thus obtained with saponifying agents.

8. Process for the manufacture of intermediate products which are of great value for the manufacture of indigoid dyestuffs, consisting in substituting in ε-ε-naphththioindoxyls the hydrogen atoms of the active methylene group by an anil radical by condensing the ε-ε-naphththioindoxyls with an aromatic nitroso compound, and then treating the products thus obtained with saponifying agents.

9. As new products the herein described naphththioindoxyls derivatives, of which the hydrogen atoms of the reactive methylene group are substituted by radicals, which products form yellow to metallic green powders, dissolving in benzene with yellow to red violet color, and, when treated with saponifying agents, split up into thionaphthisatins.

10. As new products the herein described naphththioindoxyl derivatives, of which the hydrogen atoms of the reactive methylene group are substituted by an anil group, which products form green powders having a metallic lustre, dissolving in benzene with violet color, and when treated with saponifying agents, split up into thionaphthisatins and aromatic amino compounds.

11. As new products the ε-naphththioindoxyl derivates, of which the hydrogen atoms of the reactive methylene group are substituted by an anil group, which products form green powders having a metallic lustre, dissolving in benzene with violet color, and when treated with saponifying agents, split up into ε-thionaphthisatins and aromatic amino compounds.

12. As new products the ε-ε-naphththioindoxyl derivatives, of which the hydrogen atoms of the reactive methylene group are substituted by an anil group, which products form green powders having a metallic lustre, dissolving in benzene with violet color, and when treated with saponifying agents, split up into ε-ε-thionaphthisatins and aromatic amino compounds.

13. As a new product the ε-ε-naphththioindoxyl derivatives, of which the hydrogen atoms of the reactive methylene group are substituted by a p-dimethylaminoanil group, which product forms a green powder having a metallic lustre, dissolving in benzene with violet color, and, when treated with saponifying agents, split up into ε-ε-naphththioisatin and p-aminodiamethylaniline.

In witness whereof I have hereunto signed my name this 3rd day of November, 1923, in the presence of two subscribing witnesses.

RICHARD TOBLER.

Witnesses:
AMAND RAUN,
MADELEINE SPENGLER.